US008725439B2

(12) United States Patent
Kim

(10) Patent No.: US 8,725,439 B2
(45) Date of Patent: May 13, 2014

(54) ELECTRONIC DEVICE CONTROLLER FOR IMPROVING PERFORMANCE OF ELECTRONIC DEVICE

(75) Inventor: Jung Rae Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 663 days.

(21) Appl. No.: 12/885,921

(22) Filed: Sep. 20, 2010

(65) Prior Publication Data

US 2011/0071779 A1 Mar. 24, 2011

(30) Foreign Application Priority Data

Sep. 23, 2009 (KR) ........................ 10-2009-0090176

(51) Int. Cl.
*G01R 21/00* (2006.01)
*G06F 13/00* (2006.01)
(52) U.S. Cl.
USPC ............................................ 702/61; 711/154
(58) Field of Classification Search
USPC ............... 702/61, 57, 60, 62, 81, 84–85, 107, 702/127, 131–132, 182–183, 186, 189; 711/100, 111, 154, 156, 170; 700/90, 700/95, 97, 108–109; 365/51, 226–228
See application file for complete search history.

(56) References Cited

U.S. PATENT DOCUMENTS

| 2004/0104707 | A1* | 6/2004 | May et al. ................ 320/136 |
| 2007/0067598 | A1 | 3/2007 | Fujimoto |
| 2007/0183179 | A1 | 8/2007 | Maeda |
| 2009/0106510 | A1 | 4/2009 | Fujihara |

FOREIGN PATENT DOCUMENTS

| JP | 2006-178923 A | 7/2006 |
| JP | 2009-098941 A | 5/2009 |
| KR | 1020060055518 A | 5/2006 |
| KR | 1020070026488 A | 3/2007 |

OTHER PUBLICATIONS

Shin et al., Energy-Monitoring Tool for Low-Power Embedded Programs, Jul.-Aug. 2002, 2002 IEEE, pp. 7-17.*

* cited by examiner

*Primary Examiner* — Toan Le
(74) *Attorney, Agent, or Firm* — Sughrue Mion, PLLC

(57) ABSTRACT

An electronic device controller and an electronic system including the same are provided. The electronic device controller includes a calculation unit for calculating performance information of an electronic device based on detailed information regarding an operation and state of the electronic device and a tuning unit for tuning at least one of the detailed information, based on the calculated performance information of the electronic device.

15 Claims, 8 Drawing Sheets

ELECTRONIC DEVICE CONTROLLER FOR IMPROVING PERFORMANCE OF ELECTRONIC DEVICE

CROSS-REFERENCE TO RELATED APPLICATIONS

This application claims the benefit of Korean Patent Application No. 10-2009-0090176, filed on Sep. 23, 2009, in the Korean Intellectual Property Office, the disclosure of which is incorporated herein in its entirety by reference.

SUMMARY

The inventive concept relates to electronic device controllers, and more particularly, to an electronic device controller for improving the performance of an electronic device by collecting and tuning information regarding the electronic device.

In general, a SOC (System-On-Chip) includes a controller, via which the SOC may be connected to an electronic device. Examples of the electronic device are non-volatile memory that is mainly used to store a program, e.g., a hard disc drive (HDD), read-only memory (ROM), and flash memory, and volatile memory that may be used for various purposes, e.g., synchronous random access memory (SRAM) and synchronous dynamic RAM (SDRAM). In addition, an external display device, e.g., a liquid crystal display (LCD) or a light-emitting diode (LED), may be connected to the SOC, and an internal device, e.g., cache memory included in the SOC, may be used as the electronic device. In a system that includes the SOC and the electronic device, power consumption should be minimized in both the SOC and the electronic device in order to improve the performance of the system. To this end, it is important to optimize the performance of the system by obtaining information related to power consumption and calculating an amount of the power consumption based on the information.

Conventionally, information regarding power consumption is obtained through actual measurement. For example, an amount of current is measured using an ammeter, and the performance of a system is measured by running a software application and measuring an actual time for running the software application. However, these methods do not allow dynamic tuning according to the pattern of a user of the system while the system is in use. Also, the amount of current cannot be measured using the ammeter according to circumstances, e.g., the state of a board. Also, since these methods are greatly influenced by external causes, an error in measurement is noticeable. Accordingly, these methods are difficult to be used for precise tuning The inventive concept provides an electronic device controller for improving the performance of an electronic device by tuning detailed information regarding the electronic device.

According to an aspect of the inventive concept, there is provided an electronic device controller including: a calculation unit for calculating performance information of an electronic device based on detailed information regarding an operation and state of the electronic device; and a tuning unit for tuning at least one of the detailed information, based on the calculated performance information of the electronic device.

The electronic device controller of claim 1, further including a storage unit for storing the detailed information and the performance information of the electronic device, wherein the calculation unit calculates the performance information of the electronic device based on the detailed information that is not tuned and the performance information of the electronic device based on the tuned detailed information and the tuning unit selects the detailed information that is not tuned or the tuned detailed information, based on the performance information of the electronic device calculated based on the detailed information that is not tuned and the performance information of the electronic device calculated based on the tuned detailed information.

The tuning unit compares the performance information of the electronic device calculated by the calculation unit with a predetermined performance value, and tunes the detailed information to detailed information corresponding to the reference performance value based on the result of comparison.

The detailed information including: interface information regarding the operation of the electronic device and state information regarding an internal state of the electronic device and wherein the electronic device controller further includes a transceiving unit for transmitting at least one of the detailed information to the electronic device or an external display device The calculation unit calculates the performance information of the electronic device by using predetermined performance factors allocated to the interface information and the state information, respectively.

The calculation unit calculates the performance information of the electronic device by multiplying total numbers of pieces of the detailed information that are categorized according to type by the performance factors allocated to the types of the pieces of the detailed information, respectively.

The tuning unit includes: a tuning block for tuning the detailed information by changing an order of at least one the detailed information or deleting or rearranging at least one of the detailed information; and a selection block for selecting the detailed information that is not tuned or the tuned detailed information, which leads to a better improvement in the performance of the electronic device, either by comparing the performance information of the electronic device calculated based on the detailed information that is not tuned with the performance information of the electronic device calculated based on the tuned detailed information or by comparing the performance information of the electronic device calculated by the calculation unit with the reference performance value.

The interface information includes at least one command for the electronic device, and the tuning unit tunes the detailed information by changing an order of the at least one command.

The electronic device is a memory device, the electronic device controller is a memory controller for controlling the memory device and the interface information includes a command for accessing the memory device.

The performance information includes an amount of power consumption of the electronic device, the tuning unit either compares an amount of power consumption of the electronic device calculated based on the detailed information that is not tuned with an amount of power consumption of the electronic device calculated based on the tuned detailed information and then selects the detailed information that is not tuned or the tuned detailed information, which corresponds to a less amount of power consumption, based on the result of comparison, or compares the amount of power consumption of the electronic device calculated by the calculation unit with the reference amount of power consumption and then tunes the detailed information to correspond to the reference amount of power consumption based on the result of comparison.

According to another aspect of the inventive concept, there is provided an electronic device controller including: a storage unit for storing detailed information regarding an operation and state of an electronic device and performance information of the electronic device; a calculation unit for calculating the performance information of the electronic device based on the detailed information; and a tuning unit for turning at least one of the detailed information stored in the storage unit, and selecting the detailed information that is not tuned or the tuned detailed information based on the performance information of the electronic device calculated based on the detailed information that is not tuned and the performance information of the electronic device calculated based on the tuned detailed information.

The calculation unit calculates the performance information of the electronic device by using predetermined performance factors allocated to types of pieces of the detailed information that are categorized according to type.

According to an aspect of the inventive concept, there is provided an electronic device controller including a calculation unit for calculating which calculates first performance information of an electronic device based on detailed first information regarding an operation and , the first information including at least one of information regarding an operation of the electronic device and information regarding a state of the electronic device; and a tuning unit for tuning at least one which tunes the first detailed information, based on the calculated first performance information of the electronic device, to generate second information.

According to another aspect of the inventive concept, there is an electronic device controller including: a storage unit for storing detailed which stores first information regarding an operation and state of an electronic device and first performance information of the electronic device, the first information including at least one of information regarding an operation and information regarding a state of the electronic device; a calculation unit for calculating which calculates the first performance information of the electronic device based on the detailed first information; and a tuning unit for turning which tunes at least one the detailed information of the information regarding the operation and the state, stored in the storage unit, to generate second information and selecting the detailed information that is not tuned or the tuned detailed information selects one of the first and the second information based on the first performance information of the electronic device calculated based on the detailed information that is not tuned and the second performance information of the electronic device calculated based on the tuned detailed second information.

BRIEF DESCRIPTION OF THE DRAWINGS

Exemplary embodiments of the inventive concept will be more clearly understood from the following detailed description taken in conjunction with the accompanying drawings in which.

DETAILED DESCRIPTION OF THE EXEMPLARY EMBODIMENTS

Figure 1A:
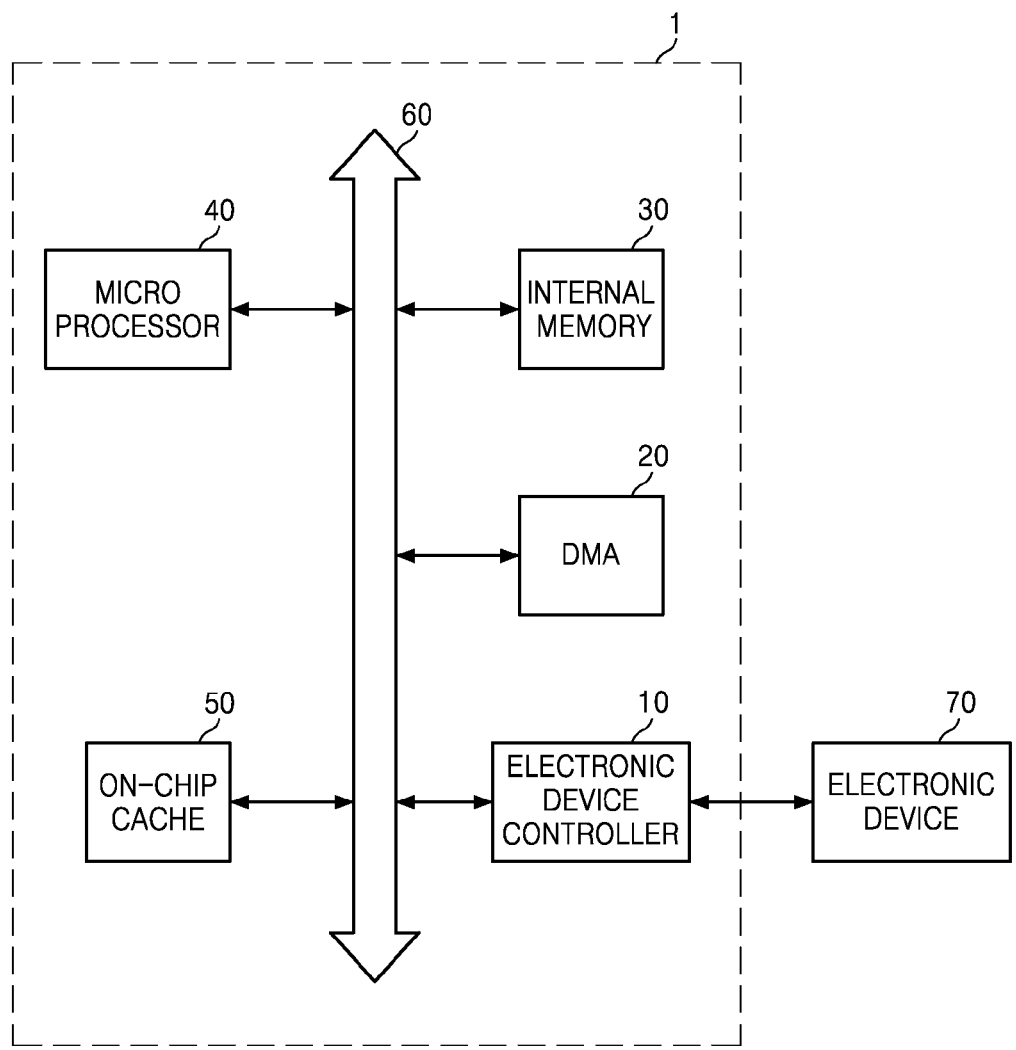
FIG. 1A is a block diagram of a SOC (System-On-Chip) that includes an electronic device controller, according to an exemplary embodiment of the inventive concept.

The present inventive concept now will be described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure will be thorough and complete, and will fully convey the scope of the invention to those skilled in the art. In the drawings, the size and relative sizes of layers and regions may be exaggerated for clarity. Like numbers refer to like elements throughout.

Expressions such as "at least one of," when preceding a list of elements, modify the entire list of elements and do not modify the individual elements of the list.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular exemplary embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

The present inventive concept relates to a method of obtaining and estimating workloads, i.e., the intensity and the pattern of the workloads that a semiconductor storage device will undergo before throttling the performance of the semiconductor storage device. Only after the intensity and the pattern of workloads are obtained, the optimal performance of the semiconductor storage device can be determined to improve the operable life and the endurance limit of the semiconductor storage device.

Figure 1B:
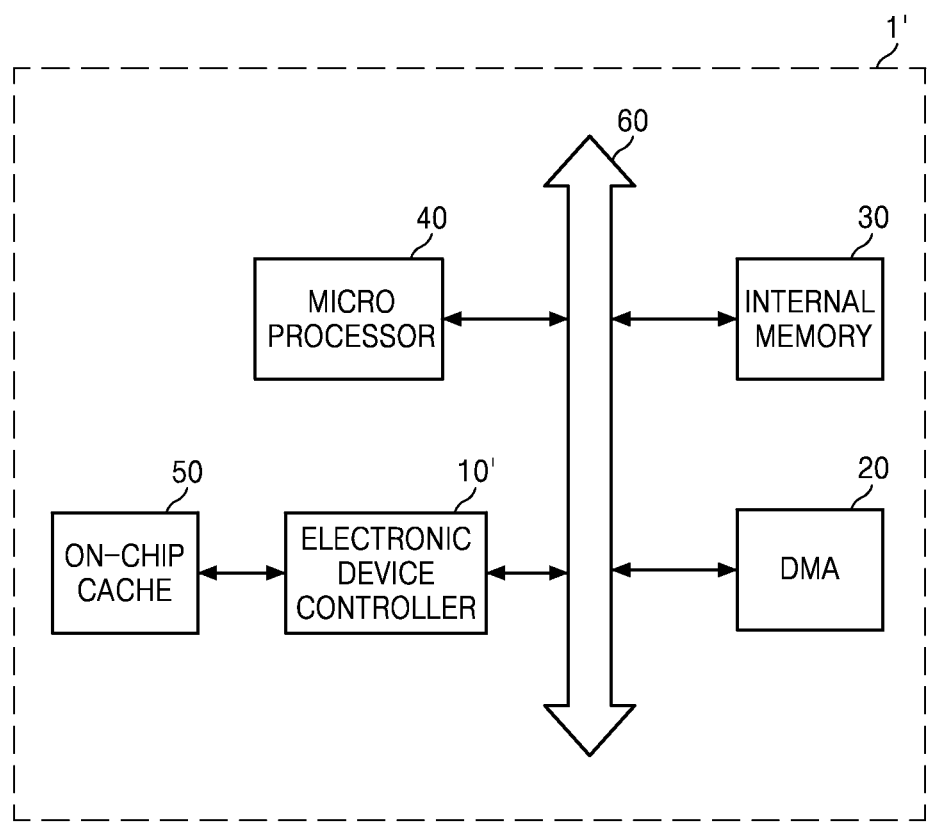
FIG. 1B is a block diagram of a SOC that includes an electronic device controller, according to another exemplary embodiment of the inventive concept.

FIG. 1A is a block diagram of a SOC (System-On-Chip) 1 that includes an electronic device controller 10, according to an exemplary embodiment of the inventive concept. FIG. 1B is a block diagram of a SOC 1' that includes an electronic device controller 10' for controlling an on-chip cache 50, according to another exemplary embodiment of the inventive concept. Referring to FIG. 1A or 1B, the SOC 1 (or 1') includes an electronic device controller 10 (or 10'), a direct memory access (DMA) unit 20, an internal memory unit 30, a microprocessor 40, and the on-chip cache 50.

The SOCs 1 and 1' may further include other additional blocks which will not be described for convenience of explanation. The electronic device controller 10 (or 10'), the DMA unit 20, the internal memory 30, the microprocessor 40, and the on-chip cache 50 are connected via a system bus 60 to communicate with one another. Some of the constitutional elements of the SOC 1 and the SOC 1' will not be described in detail if they are less relevant for describing the inventive concept.

In the exemplary embodiments of FIGS. 1A and 1B, both the electronic device controllers 10 and 10' are illustrated as being located within the SOCs 1 and 1', respectively, but the inventive concept is not limited thereto. For example, the electronic device controller 10 may be located outside the SOC 1.

The microprocessor 40 provides interface information related to an operation of an electronic device 70 to the electronic device controller 10 or 10' via the system bus 60 so that the electronic device controller 10 or 10' may control the electronic device 70. In this case, the electronic device 70 may be a memory device, a cache memory included in the SOC 1 or 1', a camera, or a liquid crystal display (LCD).

Referring to FIG. 1B, the electronic device controller 10' may tune, i.e., adjust or optimize, the detailed information regarding the on-chip cache 50. The detailed information includes interface information and state information regarding the on-chip cache 50. The interface information is related to an operation of a cache memory and is received via the system bus 60. The state information indicates an internal state of the cache memory. The cache memory may be the on-chip cache 50. In an exemplary embodiment, the detailed information includes the interface information or the state information.

Hereinafter, an exemplary embodiment of the inventive concept will be described with reference to FIG. 1A on an assumption that the electronic device 70 is a memory device and the electronic device controller 10 is a memory controller, but the inventive concept is not limited thereto.

The interface information may include, for example, an 'active' command, a 'read' command, a 'write' command, and a 'precharge' command related to an operation of the electronic device 70 that is a memory device.

The electronic device controller 10 may also receive state information regarding the electronic device 70 from the electronic device 70. The state information regarding the electronic device 70 may include an 'open' mode, a 'close' mode, and a 'self-refresh' mode related to an internal state of a memory cell array included in the electronic device 70.

Although not shown in FIG. 1A, the electronic device controller 10 may be connected to an external display device (not shown) via the system bus 60 in order to exchange information with the external display device. In this case, a user may check various information which allows the electronic device controller 10 to control the electronic device 70, e.g., the interface information and the state information, on the external display device.

Figure 2:
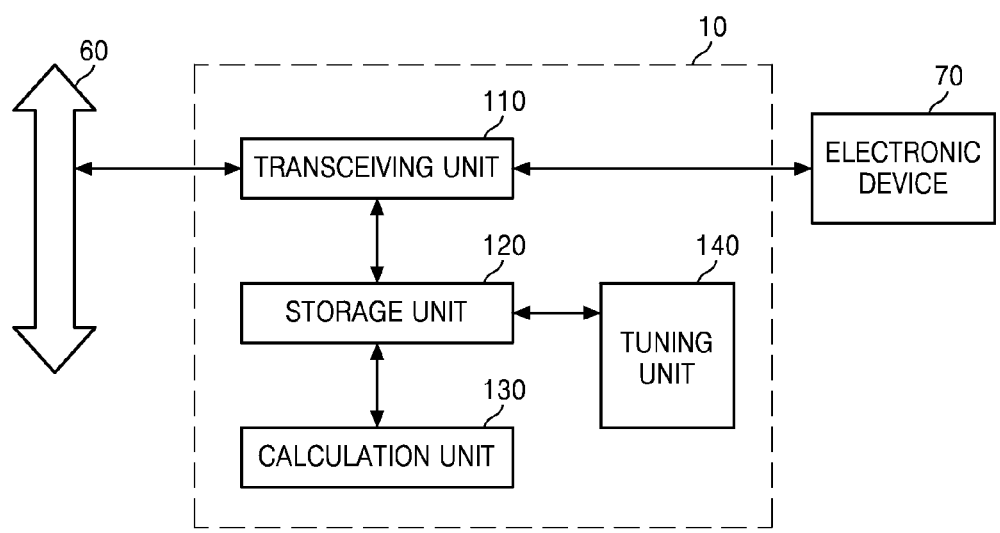
FIG. 2 is a block diagram illustrating in detail the electronic device controller of FIG. 1A, according to an exemplary embodiment of the inventive concept.

FIG. 2 is a block diagram illustrating in detail the electronic device controller 10 of FIG. 1A, according to an exemplary embodiment of the inventive concept. Referring to FIG. 2, the electronic device controller 10 includes a transceiving unit 110, a storage unit 120, a calculation unit 130, and a tuning unit 140.

The transceiving unit 110 may receive interface information via a system bus 60, receive state information regarding an electronic device 70 from the electronic device 70, and output detailed information including the interface information and the state information via the system bus 60.

The storage unit 120 may store the detailed information including the interface information and the state information, and performance information of the electronic device 70. The storage unit 120 may further store information regarding basic operations of the electronic device 70, e.g., the specifications of the electronic device 70, detailed information tuned by the tuning unit 140, and performance information of the electronic device 70 that is turned based on the tuned detailed information.

The calculation unit 130 calculates the performance information of the electronic device 70 based on the detailed information. The calculated performance information may be stored in the storage unit 120. The calculation unit 130 may be embodied as hardware and/or software installed in the electronic device controller 10.

For example, the calculation unit 130 may calculate the performance information of the electronic device 70 by multiplying the total numbers of pieces of the detailed information that are categorized according to type by performance factors allocated to the types of the pieces of the detailed information, respectively. In this case, the performance factor allocated to each of the types of the pieces of the detailed information may be a value included in the specifications of the electronic device 70, which is stored in the storage unit 120.

The transceiving unit 110 may supply the detailed information stored in the storage unit 120 to the electronic device 70 or may supply the detailed information and the performance information regarding the electronic device 70 to the system bus 60. The detailed information may be supplied to an external display device (not shown) via the system bus 60. That is, unlike a general controller, the electronic device controller 10 according to the current exemplary embodiment may not only control the operation of the electronic device 70 but also provide a user with information regarding an operating state and performance of the electronic device 70.

The calculated performance information of the electronic device 70 may include, for example, an amount of power consumed when the electronic device 70 operates, an amount of time that the electronic device 70 performs an operation, and the data transmitting and receiving capabilities of the electronic device 70, but the inventive concept is not limited thereto.

The tuning unit 140 tunes the detailed information (the interface information and the state information) regarding the electronic device 70 and then stores the tuned detailed information in the storage unit 120. The tuning unit 140 may tune the detailed information several times. Here, the tuning of the detailed information may be understood as changing or updating the detailed information. The tuning of the detailed information may include tuning of the interface information and/or tuning of the state information.

For example, the tuning of interface information may include adjusting an order of a plurality of commands that the electronic device 70 executes, that is, rearranging the order of the plurality of commands. The tuning of the state information may not mean that the state information is changed directly but mean that the change of the state information is caused by the tuning of the interface information regarding the electronic device 70. However, the inventive concept is not limited thereto.

The calculation unit 130 calculates performance information of the electronic device 70 that is tuned based on the tuned detailed information and then stores the calculated performance information in the storage unit 120. More specifically, the calculation unit 130 may calculate the performance information of the electronic device 70 that has been tuned, by multiplying the total numbers of pieces of the tuned detailed information that are categorized according to type by performance factors allocated to the types of the pieces of the tuned detailed information, respectively.

The transceiving unit 110 may supply the tuned detailed information stored in the storage unit 120 to the electronic device 70 or may supply the tuned detailed information and the performance information of the electronic device 70 that has been tuned to the system bus 60. In this case, the tuned detailed information and the performance information of the electronic device 70 that has been tuned may be supplied to an external display device (not shown) via the system bus 60.

Also, the tuning unit 140 may determine whether the detailed information that has not been tuned or the tuned detailed information is to be supplied to the electronic device 70 or the system bus 60, based on the performance information of the electronic device 70 that has not yet been tuned and the performance information of the electronic device 70 that has been tuned.

For example, the tuning unit 140 may compare the performance information regarding the electronic device 70 that is calculated based on the detailed information received via the system bus 60 with the performance information regarding the electronic device 70 that is calculated based on the tuned detailed information, select either the detailed information that has not been tuned or the tuned detailed information that leads to a better improvement in the performance of the electronic device 70, and output the selected detailed information to the electronic device 70, thereby improving the performance of the electronic device 70. Accordingly, the electronic device controller 10 may access the electronic device 70 based on the tuned interface information, and thus, both the performance of the electronic device 70 and the performance of a system that includes the electronic device 70 may be improved.

Alternatively, the tuning unit 140 may compare the performance information of the electronic device 70 that is calculated by the calculation unit 130 with a predetermined reference performance value and may then tune the detailed information based on the result of calculation.

For example, if the performance information of the electronic device 70 that is calculated by the calculation unit 130 at a predetermined point of time or for a predetermined time period, is less or greater than the reference value, then the tuning unit 140 may tune the detailed information to be updated with detailed information corresponding to the reference value. To this end, the reference performance value and the detailed information corresponding to the reference performance value may have been determined beforehand, for example, through a simulation or a test and then been stored.

For example, if it is assumed that the performance information is an amount of power consumption, a reference amount of power consumption is 10 mW, and an amount of power consumption of the electronic device 70 according to the detailed information is 20 mW, then the amount of power consumption is less than the reference amount of power consumption. Thus, the tuning unit 140 may tune the detailed information in order to change the detailed information. Accordingly, not only the performance of the electronic device 70 but also the performance of the system that includes the electronic device 70 may be improved.

Also, the tuning unit 140 may output either the received detailed information or the tuned detailed information, which leads to a better improvement in the performance of the electronic device 70, via the system bus 60 so that information regarding the electronic device 70, the performance of which is improved may be provided to a user.

For example, a method of tuning detailed information regarding the electronic device 70 by the tuning unit 140 in order to reduce an amount of power consumption of the electronic device 70, will now be described. If it is assumed that an amount of power consumption of the electronic device 70 based on detailed information that is not tuned is greater than an amount of power consumption of the electronic device 70 based on tuned detailed information, then the tuning unit 140 may supply the tuned detailed information to the electronic device 70 in order to reduce the amount of power consumption of the electronic device 70 and may also supply the tuned detailed information to a user via the system bus 60.

An operation of the electronic device controller 10' that controls the on-chip cache 50 illustrated in FIG. 1B will now be described with reference to FIGS. 1B and 2. The transceiving unit 110 receives interface information related to an operation of the on-chip cache 50 and state information of the on-chip cache 50 via the system bus 60, and stores detailed information that includes the interface information and state information of the on-chip cache 50 in the storage unit 120.

The interface information related to the on-chip cache 50 may include request information, e.g., a cache hit, a cache miss, and bypass information. The state information of the on-chip cache 50 may include locality information, e.g., clock information and refresh information.

The calculation unit 130 calculates performance information of the on-chip cache 50 based on the detailed information of the on-chip cache 50. The calculated performance information is stored in the storage unit 120. The transceiving unit 110 may transmit the detailed information stored in the storage unit 120 to the on-chip cache 50 and may output the detailed information and performance information of the on-chip cache 50 via the system bus 60. In this case, the detailed information and performance information of the on-chip cache 50 may be provided to an external display device (not shown) via the system bus 60.

The tuning unit 140 may tune the detailed information (that is, the interface information and state information) of the on-chip cache 50 and store the tuned detailed information in the storage unit 120. The calculation unit 130 calculates performance information of the on-chip cache 50 that is tuned based on the tuned detailed information and stores the calculated performance information in the storage unit 120.

The transceiving unit 110 may transmit the tuned detailed information stored in the storage unit 120 to the on-chip cache 50 and may transmit the tuned detailed information and the performance information of the tuned on-chip cache 50 to the system bus 60. In this case, the tuned detailed information and the performance information of the tuned on-chip cache 50 may be output to an external display device (not shown) via the system bus 60.

Also, the tuning unit 140 may select whether the detailed information or the tuned detailed information is to be transmitted to the on-chip cache 50 or the system bus 60, based on the performance of the on-chip cache 50 that was not tuned and the performance of the on-chip cache 50 that has been tuned. As described above, the tuning unit 140 may improve the performance of the on-chip cache 50 by tuning the detailed information of the on-chip cache 50.

Figure 3:
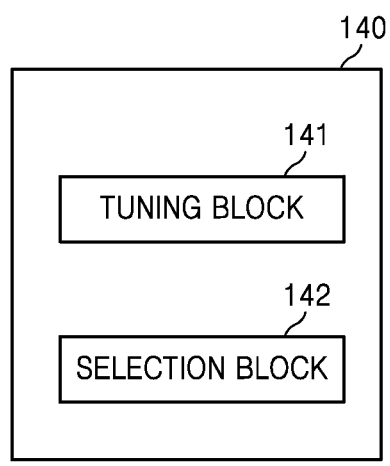
FIG. 3 is a block diagram illustrating in detail a tuning unit included in the electronic device controller of FIG. 2, according to an exemplary embodiment of the inventive concept.

FIG. 3 is a block diagram illustrating in detail the tuning unit 140 included in the electronic device controller 10 of FIG. 2, according to an exemplary embodiment of the inventive concept. The tuning unit 140 includes a tuning block 141 and a selection block 142.

The tuning block 141 tunes detailed information of the electronic device 70 of FIG. 2. The selection block 142 compares performance information of the electronic device 70 that is not tuned with performance information of the electronic device 70 that is tuned, and selects the detailed information that is not tuned or the tuned detailed information based on the result of comparison.

Alternatively, the selection block 142 may compare the performance information of the electronic device 70 with a reference performance value and select the detailed information that is not tuned or the tuned detailed information, which leads to an improvement in the performance of the electronic device 70.

Figure 4:
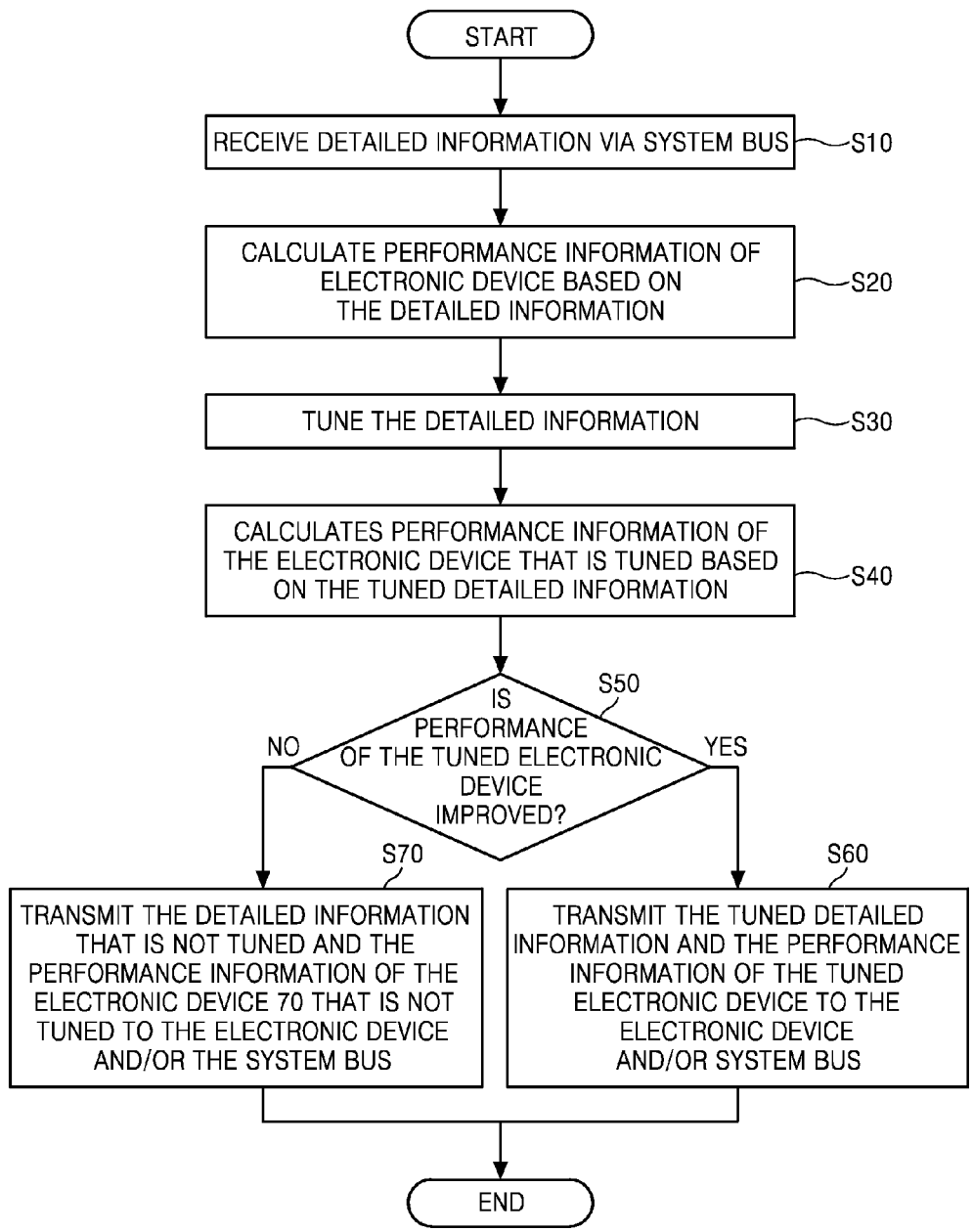
FIG. 4 is a flowchart illustrating a method of operating an electronic device controller, according to an exemplary embodiment of the inventive concept.

FIG. 4 is a flowchart illustrating a method of operating an electronic device controller, according to an exemplary embodiment of the inventive concept. The method of FIG. 4 may be performed by the electronic device controller 10 illustrated in FIG. 2. Referring to FIGS. 2 and 4, the electronic device controller 10 receives detailed information that includes interface information related to an operation of the electronic device 70 and state information of the electronic device 70 via the system bus 60 (operation S10).

Next, the calculation unit 130 calculates performance information of the electronic device 70 based on the detailed information (operation S20). Next, the tuning unit 140 tunes the detailed information (operation S30), and the calculation unit 130 calculates performance information of the electronic device 70 that is tuned based on the tuned detailed information (operation S40).

Next, the tuning unit 140 determines whether the performance information of the tuned electronic device 70 that is calculated based on the tuned detailed information is better than the performance information of the electronic device 70 that is calculated based on the detailed information that is not tuned (operation S50).

If it is determined in operation S50 that the performance information of the tuned electronic device 70 that is calculated based on the tuned detailed information is better than the performance information of the electronic device 70 that is calculated based on the detailed information that is not tuned, then the tuning unit 140 may select the tuned detailed information and transmit the tuned detailed information and the performance information of the tuned electronic device 70 to the electronic device 70 and/or the system bus 60 (operation S60). If it is determined in operation S50 that the performance information of the tuned electronic device 70 that is calculated based on the tuned detailed information is not better than the performance information of the electronic device 70 that is calculated based on the detailed information that is not tuned, then the tuning unit 140 may select the detailed information that is not tuned and transmit the detailed information that is not tuned and the performance information of the electronic device 70 that was not tuned to the electronic device 70 and/or the system bus 60 (operation S70).

Figure 5:
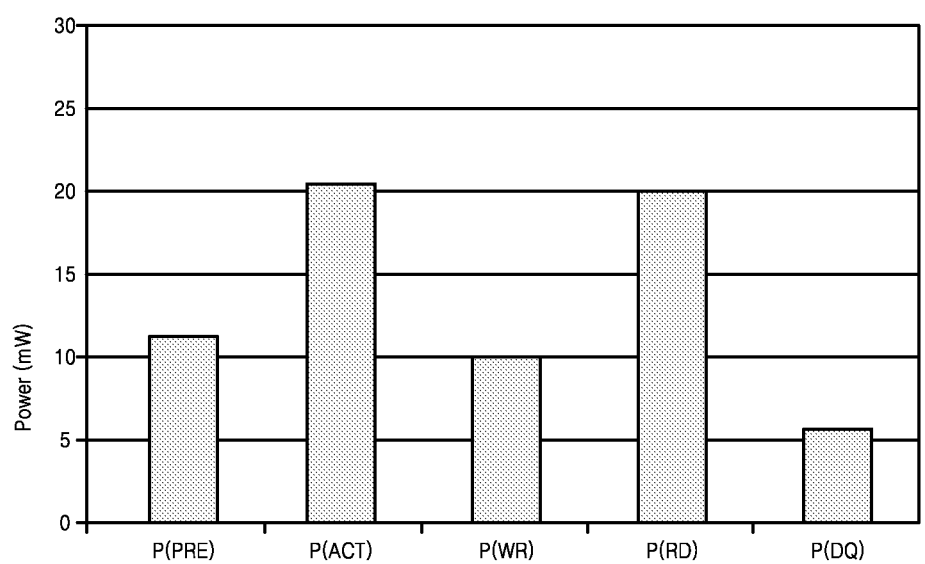
FIG. 5 is a graph illustrating an amount of power consumption according to detailed information regarding the electronic device of FIG. 2 when the electronic device is a memory device, according to an exemplary embodiment of the inventive concept.

FIG. 5 is a graph illustrating an amount of power consumption according to detailed information regarding the electronic device 70 of FIG. 2 when the electronic device 70 is a memory device, according to an exemplary embodiment of the inventive concept. Referring to FIGS. 2 and 5, the calculation unit 130 may calculate performance information of the electronic device 70 by using various types of interface information and state information (X-axis) and performance factors (Y-axis) allocated to the respective types of interface information and state information. For example, in FIG. 5, an amount of power consumption according to detailed information is illustrated as an example of performance factor.

Referring to FIG. 5, according to the current exemplary embodiment, an amount of power consumption due to 'precharge' command PRE is 11 mW, an amount of power consumption due to 'active' command ACT is 20.5 mW, an amount of power consumption due to 'write' command WR is 10 mW, an amount of power consumption due to 'read' command RD is 20 mW, and an amount of power consumption due to DQ command is 6 mW.

An amount of power consumption of the electronic device 70, which is a type of the performance information thereof, may be calculated by multiplying the total number of pieces of the interface information by the amount of power consumption corresponding to the interface information, multiplying the total number of pieces of the state information by the amount of power consumption corresponding to the interface information, and adding the results of the multiplication together. For example, if (WR)(WR)(WR)(WR)(RD)(RD)(RD) is input, that is, if the 'write' command WR is input four times and the 'read' command RD is input three times, then the amount of power consumption of the electronic device 70 is 4×10 mW+3×20 mW=100 mW.

Figure 6:
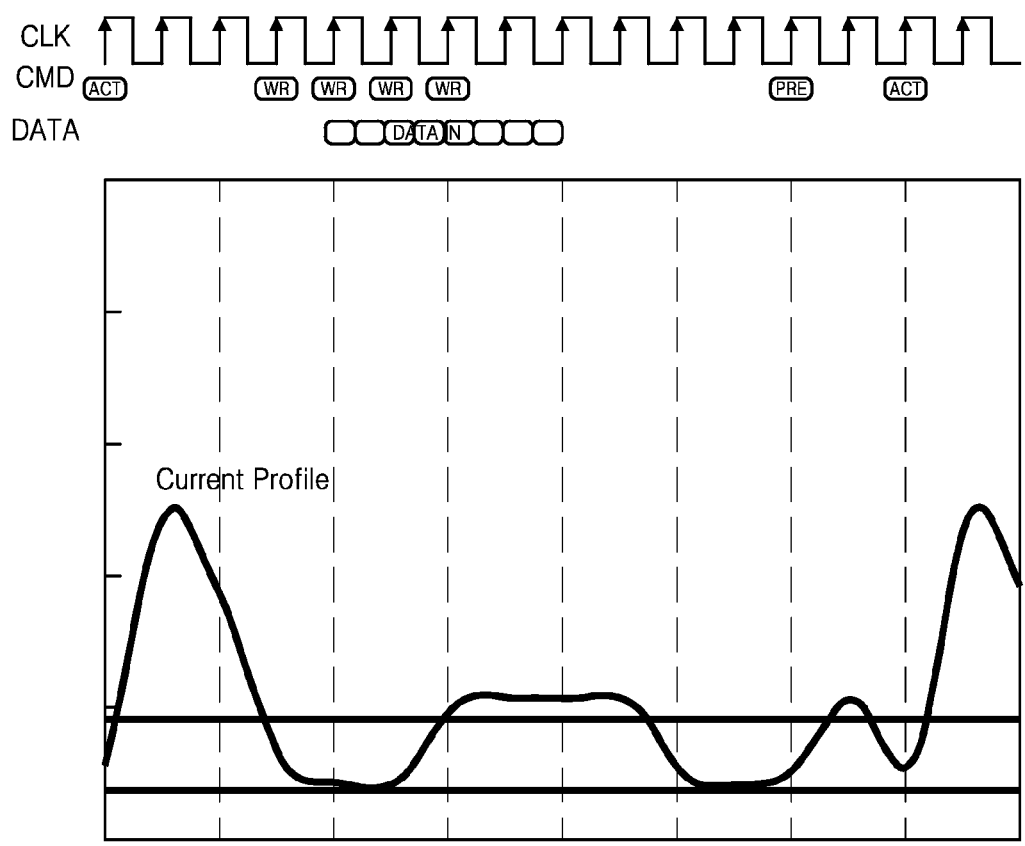
FIG. 6 is a graph illustrating a current profile according to a write command for a memory device, according to an exemplary embodiment of the inventive concept.
Figure 7:
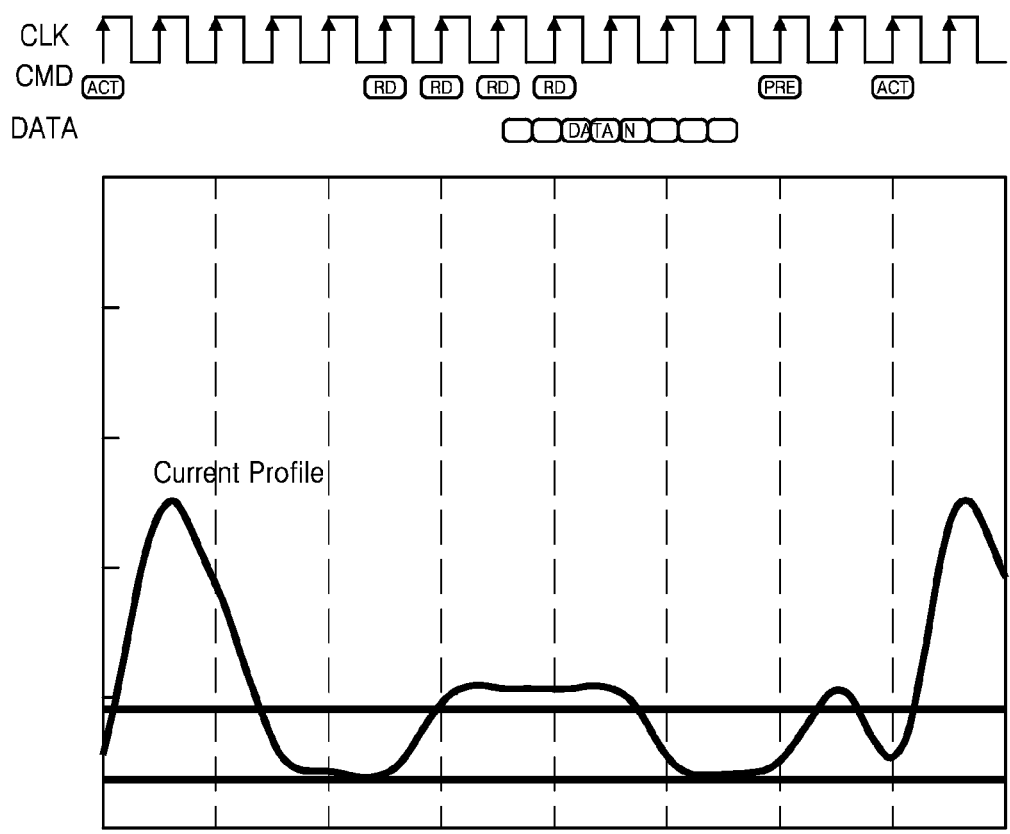
FIG. 7 is a graph illustrating a current profile according to a read command for a memory device, according to an exemplary embodiment of the inventive concept.

FIG. 6 is a graph illustrating a current profile according to a 'write' command for a memory device, according to an exemplary embodiment of the inventive concept. FIG. 7 is a graph illustrating a current profile according to a 'read' command for a memory device, according to an exemplary embodiment of the inventive concept.

Referring to FIG. 6, detailed information is a series of commands CMD that include an 'active' command ACT, four 'write' commands WR, and a 'precharge' command PRE. Referring to FIG. 7, detailed information is a series of commands CMD that include an 'active' command ACT, four 'read' commands RD, and a 'precharge' command PRE.

Referring to FIG. 6, a current rises to a predetermined level and then falls when the 'active' command ACT is input, and rises to another predetermined level and falls again when the 'write' command WR is input. Referring to FIG. 7, a current rises to another predetermined level and then falls when the 'active' command ACT is input, and rises to another predetermined level and then falls again when the 'read' command RD is input.

Then, the current rises to another predetermined level and falls again when the 'precharge' command PRE is input. As illustrated in FIGS. 6 and 7, a current profile may vary according to the type of command, and thus, an amount of power consumption may also vary according to the type of command.

Referring to FIG. 2, the tuning unit 140 may tune the performance of the electronic device 70 by tuning an order of commands included in the interface information. A tuning operation performed by the tuning unit 140, for example, when the electronic device 70 that is memory device executes the four 'write' commands WR illustrated in FIG. 6 and three different 'write' commands WR that are not shown in FIG. 6, will now be described.

If the three different 'write' commands WR are executed separately from the four 'write' commands WR illustrated in FIG. 6, then a current profile is formed according to commands in the order of the 'active' command ACT, the three different 'write' commands WR, and the 'precharge' command PRE in order to execute the three different 'write' commands WR, as similarly illustrated in FIG. 6. The tuning unit 140 may tune an order of commands CMD in such a manner that the four 'write' commands WR illustrated in FIG. 6 and the three different 'write' commands may be executed simultaneously. For example, the order of a series of commands (ACT)(WR)(WR)(WR)(WR)(PRE)(ACT)(WR)(WR)(WR)(PRE) may be tuned to (ACT)(WR)(WR)(WR)(WR)(WR)(WR)(WR)(PRE).

Then, if the four 'write' commands WR illustrated in FIG. 6 and the three different 'write' commands WR are executed simultaneously, a current profile is formed according to commands in the order of the 'active' command ACT, the seven 'write' commands WR, and the 'precharge' command PRE. Accordingly, the total number of the 'active' and 'precharge' commands ACT and PRE when the four 'write' commands WR illustrated in FIG. 6 and the three different 'write' commands WR are executed simultaneously, is less than when the three different 'write' commands WR and the four 'write' commands WR illustrated in FIG. 6 are performed separately, thereby reducing power consumption of the memory device.

While the inventive concept has been particularly shown and described with reference to exemplary embodiments thereof, it will be understood that various changes in form and details may be made therein without departing from the spirit and scope of the following claims.

What is claimed is:

1. A memory controller for controlling a memory device, the memory controller comprising:
   a transceiving unit configured to receive first interface information regarding an operation of the memory device via a system bus and first state information from the memory device;
   a calculation unit configured to calculate first performance information based on first detailed information including the first interface information and the first state information and second performance information based on second detailed information including second interface information and second state information;
   a tuning unit configured to generate the second detailed information based on the first detailed information and select one of the first detailed information and the second detailed information based on the first performance information and the second performance information; and
   a storage unit configured to store the first detailed information, the second detailed information, the first performance information and the second performance information,
   wherein the transceiving unit transmits the selected one of the first detailed information and the second detailed information to the memory device, and
   wherein the first state information and the second state information respectively include state information corresponding to an internal state of a memory cell array of the memory device.

2. The memory controller of claim 1, wherein the first and second state information corresponding to the internal state of the memory cell array comprise at least one of an open mode, a close mode and a self-refresh mode.

3. The memory controller of claim 1, wherein the tuning unit compares the first performance information with a predetermined performance value in a comparison, and generates the second detailed information corresponding to the predetermined performance value based on a result of the comparison.

4. The memory controller of claim 3, wherein the calculation unit calculates the first performance information by using predetermined performance factors allocated to the first interface information and the first state information, respectively.

5. The memory controller of claim 4, wherein the calculation unit calculates the first performance information by multiplying total numbers of pieces of the first detailed information that are categorized according to type by the performance factors allocated to types of the pieces of the first detailed information, respectively.

6. The memory controller of claim 3, wherein the tuning unit comprises:
   a tuning block configured to generate the second detailed information by changing an order of at least one of the first interface information and the first state information or by deleting or rearranging at least one of the first interface information and the first state information; and
   a selection block which selects the first detailed information or the second detailed information, by comparing the first performance information with the second performance information or by comparing the first performance information with the predetermined performance value.

7. The memory controller of claim 3, wherein the first interface information and the second interface information respectively comprises at least one command for the memory device, and
   the tuning unit generates the second detailed information by changing an order of the at least one command.

8. The memory controller of claim 3, wherein the first performance information comprises an amount of power consumption of the memory device based on the first detailed information,
   the tuning unit compares the amount of power consumption of the memory device based on the first detailed information with an amount of power consumption of the memory device based on the second detailed information and selects one of the first detailed and the second detailed information, which corresponds to lower power consumption, or compares an amount of power consumption of the memory device calculated by the calculation unit with a reference amount of power consumption and generates the second detailed information to correspond to the reference amount of power consumption based on a result of comparison.

9. A System On Chip(SOC) comprising the memory controller of claim 1 and a cache memory or a display device.

10. An electronic system comprising the memory controller of claim 1.

11. The memory controller of claim 1, wherein the first interface information and the second interface information respectively include interface information comprising a command to control the memory device, and wherein the command to control the memory device comprises at least one of an active command, a read command, a write command and a precharge command.

12. A memory controller for controlling a memory device, the memory controller comprising:
- a transceiving unit configured to receive first interface information regarding an operation of the memory device via a system bus and first state information from the memory device;
- a calculation unit configured to calculate first performance information based on first detailed information including the first interface information and the first state information and second performance information based on second detailed information including second interface information and second state information; and
- a tuning unit configured to generate the second detailed information based on the first detailed information and select one of the first detailed information and the second detailed information based on the first performance information and the second performance information.

13. The memory controller of claim 12, wherein the calculation unit calculates the first performance information of the memory device by using predetermined performance factors allocated to types of pieces of the first detailed information that are categorized according to type.

14. The memory controller of claim 12, wherein the first interface information and the second interface information respectively include interface information comprising a command to control the memory device, and
wherein the command to control the memory device comprises at least one of an active command, a read command, a write command and a precharge command.

15. The memory controller of claim 12, the first state information and the second state information respectively include state information corresponding to an internal state of a memory cell array of the memory device,
wherein the state information corresponding to the internal state of the memory cell array comprises at least one of an open mode, a close mode and a self-refresh mode.

* * * * *